United States Patent
Xie et al.

(10) Patent No.: US 11,122,630 B2
(45) Date of Patent: Sep. 14, 2021

(54) INFORMATION SENDING METHOD AND APPARATUS AND INFORMATION RECEIVING METHOD AND APPARATUS

(71) Applicant: Huawei Technologies Co., Ltd., Shenzhen (CN)

(72) Inventors: Xinqian Xie, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 16/697,872

(22) Filed: Nov. 27, 2019

(65) Prior Publication Data
US 2020/0100300 A1 Mar. 26, 2020

Related U.S. Application Data

(63) Continuation of application No. PCT/CN2018/099981, filed on Aug. 10, 2018.

(30) Foreign Application Priority Data

Aug. 11, 2017 (CN) .......................... 201710687924.7

(51) Int. Cl.
*H04W 74/08* (2009.01)
*H04W 74/00* (2009.01)
(Continued)

(52) U.S. Cl.
CPC ....... *H04W 74/0833* (2013.01); *H04W 48/12* (2013.01); *H04W 48/16* (2013.01);
(Continued)

(58) Field of Classification Search
CPC . H04W 74/0883; H04W 76/11; H04W 48/12; H04W 48/16; H04W 72/0446;
(Continued)

(56) References Cited

U.S. PATENT DOCUMENTS

2010/0296467 A1\* 11/2010 Pelletier .............. H04W 74/002
370/329
2012/0188958 A1 7/2012 Suzuki et al.
(Continued)

FOREIGN PATENT DOCUMENTS

CN 101640922 A 2/2010
CN 101969697 A 2/2011
(Continued)

OTHER PUBLICATIONS

AT&T, "LTE Assisted Initial Access Procedure for NR", 3GPP TSG-RAN WG2 Meeting #97 R2-1701141, Athens, Greece, Feb. 13-17, 2017, total 3 pages.
(Continued)

*Primary Examiner* — Walli Z Butt
*Assistant Examiner* — Thad N Defauw
(74) *Attorney, Agent, or Firm* — Slater Matsil, LLP (57) ABSTRACT

Embodiments of this application provide an information sending method and an information receiving method. A network device receives a random access signal of a terminal device from the terminal device on a random access resource, where the random access resource is on a first uplink carrier or a second uplink carrier, and the first uplink carrier and the second uplink carrier are corresponding to a same downlink carrier; the network device determines a random access identifier corresponding to the random access resource according to a time-frequency resource sequence number of the random access resource and a carrier identifier of a carrier on which the random access resource is and the network device generates a random access response based on the determined random access identifier, and sends the random access response to the terminal device via the downlink carrier.

20 Claims, 4 Drawing Sheets

(51) Int. Cl.
  *H04W 72/12* (2009.01)
  *H04W 72/04* (2009.01)
  *H04W 48/16* (2009.01)
  *H04W 48/12* (2009.01)
  *H04W 76/11* (2018.01)
  *H04L 5/14* (2006.01)
  *H04L 5/22* (2006.01)

(52) U.S. Cl.
  CPC ... *H04W 72/0446* (2013.01); *H04W 72/0453* (2013.01); *H04W 72/1215* (2013.01); *H04W 74/006* (2013.01); *H04W 76/11* (2018.02); *H04L 5/14* (2013.01); *H04L 5/22* (2013.01)

(58) Field of Classification Search
  CPC ......... H04W 72/0453; H04W 72/1215; H04W 74/006; H04L 5/14; H04L 5/22
  See application file for complete search history.

(56) References Cited

U.S. PATENT DOCUMENTS

| | | | |
|---|---|---|---|
| 2012/0213151 | A1 | 8/2012 | Zhao et al. |
| 2012/0250520 | A1* | 10/2012 | Chen ............... H04L 5/001 370/241 |
| 2013/0034067 | A1 | 2/2013 | Umesh et al. |
| 2017/0094688 | A1 | 3/2017 | Lee et al. |
| 2018/0084550 | A1* | 3/2018 | Chen ............... H04W 76/15 |
| 2018/0324803 | A1* | 11/2018 | Rosa ............... H04W 74/0808 |
| 2019/0373452 | A1* | 12/2019 | Huang ............. H04W 24/10 |

FOREIGN PATENT DOCUMENTS

| | | |
|---|---|---|
| CN | 102325382 | 1/2012 |
| CN | 102763482 A | 10/2012 |
| CN | 103220813 A | 7/2013 |
| CN | 106686691 A | 5/2017 |
| WO | 2011018039 A1 | 2/2011 |
| WO | 2012153960 A2 | 11/2012 |
| WO | 2017076598 A1 | 5/2017 |

OTHER PUBLICATIONS

3GPP TS 38.321 V0.2.0 (Aug. 2017); 3rd Generation Partnership Project;Technical Specification Group Radio Access Network; NR; Medium Access Control (MAC) protocol specification (Release 15); total 36 pages.

3GPP TS 36.321 V14.3.0 (Jun. 2017);3rd Generation Partnership Project; Technical Specification Group Radio Access Network; Evolved Universal Terrestrial Radio Access (E-UTRA); Medium Access Control (MAC) protocol specification (Release 14); total 107 pages.

3GPP TS 38.101-1 V0.0.1 (Aug. 2017); 3rd Generation Partnership Project; Technical Specification Group Radio Acces Network; User Equipment (UE) radio transmission and reception; Part 1: Range 1 Standalone (Release 15); total 11 pages.

Huawei et al.,"RAR reception for eMTC",3GPP TSG RAN WG2 Meeting #98 R2-1706106, Hangzhou, P.R. China, May 15-19, 2017, 4 pages.

ZTE, "Remaining issues on multi-carrier Prach in NB-IoT", 3GPP TSG-RAN WG2 Meeting #96 R2-167682, Reno, USA, Nov. 14-18, 2016, 6 pages.

Huawei et al., "Addition of Random access test case 7.1.1.1.4", 3GPP TSG RAN WG5#79 R5-182405, Busan, South Korea, May 21-25, 2018, 14 pages.

Huawei "NR band definition for NR-LTE co-existence", 3GPP TSG-RAN WG4 Meeting NR #2 R4-1706677, Qingdao, China, Jun. 27-29, 2017, 3 pages.

* cited by examiner

INFORMATION SENDING METHOD AND APPARATUS AND INFORMATION RECEIVING METHOD AND APPARATUS

CROSS-REFERENCE TO RELATED APPLICATIONS

This application is a continuation of International Application No. PCT/CN2018/099981, filed on Aug. 10, 2018, which claims priority to Chinese Patent Application No. 201710687924.7, filed on Aug. 11, 2017. The disclosures of the aforementioned applications are hereby incorporated by reference in their entireties.

TECHNICAL FIELD

This application relates to the field of wireless communications technologies, and specifically, to an information sending method and apparatus and an information receiving method and apparatus.

BACKGROUND

During wireless communications system deployment, both a long term evolution (LTE) system and a 5G new radio (new radio interface, NR) system may be deployed on a frequency band whose frequency is below 6 GHz. The LTE system is usually deployed on a frequency band whose frequency is 1.8 GHz. Currently, the NR system is most likely to be deployed on a frequency band whose frequency is 3.5 GHz. In a wireless communications system, a higher carrier frequency leads to a higher path loss, and therefore a coverage area of the NR system on the frequency band F whose frequency is 3.5 GHz is smaller than a coverage area of the NR system on the frequency band whose frequency is 1.8 GHz. Generally, a network device in the NR system may use a beam forming technology based on a large-scale antenna, to improve a coverage area for downlink transmission. However, because of limitations of a size and a capability of a terminal device, a quantity of antennas that can be equipped with the terminal device is far less than a quantity of antennas that can be equipped with a base station, and an uplink coverage capability that is the same as a downlink coverage capability cannot be achieved by using the beam forming technology. Consequently, on the frequency band whose frequency is 3.5 GHz, a coverage area of the terminal device in the NR system is relatively small in an uplink direction, and cannot match a coverage area of the network device in a downlink direction. If the coverage area in the uplink direction needs to be ensured, an uplink transmission rate is limited.

To resolve a problem that the coverage area of the terminal device in the NR system is relatively small in the uplink direction, an uplink carrier of the NR system may be additionally deployed on an uplink frequency band of the LTE system, namely, the uplink frequency band whose frequency is 1.8 GHz, so as to enhance the coverage area of the terminal device in the NR system in the uplink direction. In this manner, there are both the NR system and the LTE system on the uplink frequency band whose frequency is 1.8 GHz, in other words, the NR system and the LTE system share the uplink frequency band whose frequency is 1.8 GHz.

In the LTE system, a base station configures, for a terminal device, a plurality of resources used by the terminal device to perform random access. Such the resource may be referred to as a physical random access channel (PRACH) resource. The PRACH resource includes a time domain resource and a frequency domain resource, the time domain resource includes one or more subframes of one radio frame, and the frequency domain resource includes one or more consecutive resource blocks in frequency domain.

Steps of accessing the LTE system by the terminal device are as follows:

Step A: When the terminal device needs to randomly access the LTE system, the terminal device may select one PRACH resource from the plurality of PRACH resources configured by the base station, and send a random preamble sequence (preamble) on the PRACH resource.

Step B: After receiving the preamble, the base station feeds back a random access response (RAR) to the terminal device.

Step C: The terminal device identifies, based on whether a terminal identifier carried in the received RAR, for example, a random access-radio network temporary identifier (RA-RNTI) is an RA-RNTI of the terminal device, whether the RAR is an RAR sent to the terminal device, to determine whether the preamble sent by the terminal device is correctly received by the base station, so as to determine whether a subsequent access procedure can be continued.

It can be learned that both the base station and the terminal device need to calculate the RA-RNTI. The RA-RNTI is usually calculated by using the following formula (1):

$$\text{RA-RNTI} = 1 + t\_id + 10 * f\_id \quad (1),$$

where
t_id is related to a PRACH time domain resource used by the terminal device to send the preamble, and may be specifically a sequence number of the first subframe occupied by the PRACH time domain resource; and f_id is related to a PRACH frequency domain resource used by the terminal device to send the preamble, and may be specifically a frequency domain resource sequence number of the PRACH frequency domain resource in the first subframe.

In a scenario in which the NR system and the LTE system share the uplink frequency band, the terminal device may select an uplink carrier on one of the frequency bands whose frequencies are 1.8 GHz and 3.5 GHz, to send the preamble to the network device in the NR system for random access. However, the network device in the NR system can send the RAR to the terminal device only via a downlink carrier whose frequency is 3.5 GHz.

For two terminal devices in the NR system, one terminal device selects to send a preamble on an uplink carrier on the frequency band whose frequency is 1.8 GHz, and the other terminal device selects to send a preamble on an uplink carrier on the frequency band whose frequency 3.5 GHz. If sequence numbers of PRACH time-frequency resources used by the two terminal devices to send the preambles are the same, in other words, t_id and f_id of one terminal device are the same as those of the other terminal device, RA-RNTIs calculated by the two terminal devices are the same. Similarly, RA-RNTIs calculated by the network device for the two terminal devices are also the same, in other words, RA-RNTIs in RARs sent by the network device to the two terminal devices are the same. Therefore, either of the two terminal devices cannot correctly identify, by using the RA-RNTI, whether the received RAR is RAR sent to the terminal device. The RARs sent by the base station to the two terminal devices use a same downlink carrier whose frequency is 3.5 GHz. Therefore, either of the two terminal devices also cannot correctly identify, by using the downlink carrier, whether the received RAR is RAR sent to the terminal device.

Because the terminal device cannot correctly identify the RAR by using the RA-RNTI, the following problems are caused:

If a preamble sent by a first terminal device in the two terminal devices is not correctly received by the network device, but a preamble sent by a second terminal device is correctly received by the network device, the base station sends an RAR only to the second terminal device. However, because the RA-RNTIs of the two terminal devices are the same, the two terminal devices consider, based on the RA-RNTI, that the preambles of the terminal devices are both correctly received by the network device. This apparently causes an error determining of the first terminal device, and an error occurs when the first terminal device continues to perform a subsequent access procedure. For example, the first terminal device does not resend a preamble, but incorrectly sends a message 3 used for the subsequent access procedure, and consequently random access performance of the first terminal device is affected. In addition, because the first terminal device incorrectly sends the message 3, normal sending of a message 3 of the second terminal device is also possibly affected.

SUMMARY

In view of this, embodiments of this application provide an information sending method and an information receiving method, so that a terminal device can correctly receive a random access response sent by a network device.

According to a first aspect, an embodiment of this application provides an information sending method, where the method includes: receiving, by a network device, a random access signal of a terminal device from the terminal device on a random access resource, where the random access resource is on a first uplink carrier or a second uplink carrier, and the first uplink carrier and the second uplink carrier are corresponding to a same downlink carrier; determining, by the network device, a random access identifier corresponding to the random access resource, where a random access identifier determined when the random access resource is on the first uplink carrier is a first random access identifier, a random access identifier determined when the random access resource is on the second uplink carrier is a second random access identifier, and the first random access identifier is different from the second random access identifier; and generating, by the network device, a random access response based on the determined random access identifier, and sending the random access response that includes the random access identifier to the terminal device via the downlink carrier.

In the foregoing embodiment, random access identifiers determined based on different random access resources are different, and the random access identifier determined by the terminal device and the network device based on the first random access resource is not same with the other random access identifiers. Therefore, the terminal device may correctly receive, from the network device based on the random access identifier, an RAR sent to the terminal device, so that the terminal device is prevented from incorrectly receiving an RAR of another terminal device, thereby avoiding a case in which random access performance is affected because the terminal device incorrectly receives an RAR.

Optionally, before the receiving, by the network device, the random access signal, the method further includes: sending, by the network device, configuration information to the terminal device, where the configuration information is used to indicate an identifier of a target uplink carrier, the target uplink carrier includes one or more carriers on which the terminal device is able to send a random access signal, the identifier of the target uplink carrier includes a carrier index of the target uplink carrier, and the target uplink carrier includes the first uplink carrier and the second uplink carrier.

According to a second aspect, an embodiment of this application provides an information receiving method, where the method includes: sending, by a terminal device, a random access signal to a network device on a random access resource, where the random access resource is on a first uplink carrier or a second uplink carrier, and the first uplink carrier and the second uplink carrier are corresponding to a same downlink carrier; determining, by the terminal device, a random access identifier corresponding to the random access resource, where a random access identifier determined when the random access resource is on the first uplink carrier is a first random access identifier, a random access identifier determined when the random access resource is on the second uplink carrier is a second random access identifier, and the first random access identifier is different from the second random access identifier; and receiving, by the terminal device, a random access response that includes the random access identifier from the network device on the downlink carrier based on the determined random access identifier.

Optionally, before the sending, by the terminal device, the random access signal, the method further includes: receiving, by the terminal device, configuration information from the network device, where the configuration information is used to indicate an identifier of a target uplink carrier, the target uplink carrier includes one or more carriers on which the terminal device is able to send a random access signal, the identifier of the target uplink carrier includes a carrier index of the target uplink carrier, and the target uplink carrier includes the first uplink carrier and the second uplink carrier.

According to a third aspect, an embodiment of this application provides an information sending apparatus, including: a transceiver, configured to receive a random access signal of a terminal device from the terminal device on a random access resource, where the random access resource is on a first uplink carrier or a second uplink carrier, and the first uplink carrier and the second uplink carrier are corresponding to a same downlink carrier; and a processor, configured to: determine a random access identifier corresponding to the random access resource, where a random access identifier determined when the random access resource is on the first uplink carrier is a first random access identifier, a random access identifier determined when the random access resource is on the second uplink carrier is a second random access identifier, and the first random access identifier is different from the second random access identifier; and generate a random access response that includes the random access identifier based on the determined random access identifier; where the transceiver is further configured to send the random access response to the terminal device via the downlink carrier.

Optionally, the information sending apparatus may be a network device.

Optionally, the transceiver is further configured to send configuration information to the terminal device before receiving the random access signal, where the configuration information is used to indicate an identifier of a target uplink carrier, the target uplink carrier includes one or more carriers on which the terminal device is able to send a random access signal, the identifier of the target uplink carrier includes a carrier index of the target uplink carrier, and the target uplink carrier includes the first uplink carrier and the second uplink carrier.

According to a fourth aspect, an embodiment of this application provides an information receiving apparatus, including: a transceiver, configured to send a random access signal to a network device on a random access resource, where the random access resource is on a first uplink carrier or a second uplink carrier, and the first uplink carrier and the second uplink carrier are corresponding to a same downlink carrier; and a processor, configured to: determine a random access identifier corresponding to the random access resource, where a random access identifier determined when the random access resource is on the first uplink carrier is a first random access identifier, a random access identifier determined when the random access resource is on the second uplink carrier is a second random access identifier, and the first random access identifier is different from the second random access identifier; where the transceiver is further configured to receive a random access response from the network device on the downlink carrier; and the processor is further configured to determine, based on the determined random access identifier, that the random access response that includes the random access identifier is a random access response sent to the information receiving apparatus.

Optionally, the information receiving apparatus may be a terminal device, or may be a baseband chip.

Optionally, the transceiver is further configured to receive configuration information from the network device before sending the random access signal, where the configuration information is used to indicate an identifier of a target uplink carrier, the target uplink carrier includes one or more carriers on which the terminal device is able to send a random access signal, the identifier of the target uplink carrier includes a carrier index of the target uplink carrier, and the target uplink carrier includes the first uplink carrier and the second uplink carrier.

Effects of the embodiments of these aspects are similar to those of the embodiment of the first aspect, and details are not described again.

In the foregoing aspects, the first random access identifier determined when the random access resource is on the first uplink carrier meets a first formula, the second random access identifier determined by the network device when the random access resource is on the second uplink carrier meets a second formula, and the first formula is different from the second formula.

Optionally, the first formula is used to calculate the random access identifier based on a time-frequency resource sequence number of the random access resource; and the second formula is used to calculate the random access identifier based on a time-frequency resource sequence number of the random access resource and an offset; or the second formula is used to calculate the random access identifier based on a time-frequency resource sequence number of the random access resource and a carrier sequence number of the second uplink carrier in an uplink carrier set, where the uplink carrier set includes at least one uplink carrier, and the uplink carrier in the uplink carrier set and the first uplink carrier are corresponding to a same downlink carrier.

This embodiment provides various implementations. For example, a different random access identifier may be simply calculated with reference to an offset or with reference to a carrier sequence number.

The following provides a plurality of formulas, and these formulas are merely examples. Other similar formulas may be obtained through simple variants of theses formulas.

Optionally, the first formula includes a formula (1):

$$S=1+t\_id+n1*f\_id, \quad (1)$$

where
S is the random access identifier, t_id is a sequence number of a first time unit occupied by the random access resource, f_id is a frequency domain resource sequence number of the random access resource in the first time unit, and n1 is a positive integer; and the second formula includes a formula (2):

$$S=1+t\_id+n2*f\_id+M, \quad (2)$$

where
S is the random access identifier, t_id is a sequence number of a first time unit occupied by the random access resource, f_id is a frequency domain resource sequence number of the random access resource in the first time unit, and both n2 and M are positive integers;
or the second formula includes a formula (3):

$$S=1+t\_id+n2*f\_id+n3*c\_id+M, \quad (3)$$

where
S is the random access identifier, t_id is a sequence number of a first time unit occupied by the random access resource, f_id is a frequency domain resource sequence number of the random access resource in the first time unit, c_id is a carrier sequence number of the second uplink carrier in an uplink carrier set, where the uplink carrier set includes at least one uplink carrier, and the uplink carrier in the uplink carrier set and the first uplink carrier are corresponding to a same downlink carrier, and n2, n3, and M are all positive integers.

In the foregoing aspects, for a same time unit, a frequency domain resource sequence number of at least one of random access resources on the first uplink carrier is the same as a frequency domain resource sequence number of at least one of random access resources on the second uplink carrier; and the first random access identifier determined when the random access resource is on the first uplink carrier and the second random access identifier determined when the random access resource is on the second uplink carrier meet a third formula, and the third formula is used to calculate the random access identifier based on a time-frequency resource sequence number of the random access resource and a carrier identifier.

Optionally, the third formula includes a formula (4):

$$S=1+t\_id+n2*f\_id+n3*\text{carrier\_id}, \quad (4)$$

where
S is the random access identifier, t_id is a sequence number of a first time unit occupied by the random access resource, f_id is a frequency domain resource sequence number of the random access resource in the first time unit, carrier_id is an identifier of the first uplink carrier or the second uplink carrier, and both n2 and n3 are positive integers.

In the foregoing aspects, for a same time unit, a frequency domain resource sequence number of any random access resource on the first uplink carrier is different from a frequency domain resource sequence number of any random access resource on the second uplink carrier.

Optionally, the first random access identifier determined when the random access resource is on the first uplink carrier and the second random access identifier determined when the random access resource is on the second uplink carrier meet a same formula, where the formula is used to calculate the random access identifier based on a time-frequency resource sequence number of the random access resource; or the formula is used to calculate the random access identifier based on a time-frequency resource sequence number of the random access resource and an offset; or the formula is used to calculate the random access identifier based on a time-frequency resource sequence number of the random access resource and a carrier sequence number of the second uplink carrier in an uplink carrier set, where the uplink carrier set includes at least one uplink carrier, and the uplink carrier in the uplink carrier set and the first uplink carrier are corresponding to a same downlink carrier.

Optionally, the first random access identifier determined when the random access resource is on the first uplink carrier and the second random access identifier determined when the random access resource is on the second uplink carrier meet one of the foregoing formulas (1) to (4).

In the foregoing aspects, a frequency band on which the first uplink carrier is located is different from a frequency band on which the second uplink carrier is located.

According to a fifth aspect, an embodiment of this application provides a baseband chip, including a processor and a memory, where the memory is configured to store program instructions, and the processor executes the instructions, so that a network device performs the steps in the foregoing first aspect. The information sending apparatus may be a baseband chip in the network device.

According to a sixth aspect, an embodiment of this application provides a baseband chip, including a processor and a memory, where the memory is configured to store program instructions, and the processor executes the instructions, so that a terminal device performs the steps in the foregoing second aspect.

According to a seventh aspect, an embodiment of this application provides a computer program product, where the computer program product includes computer program code, and when the computer program code is run by a network device, the network device performs the method according to any one of the first aspect or the possible implementations of the first aspect.

According to an eighth aspect, an embodiment of this application provides a computer program product, where the computer program product includes computer program code, and when the computer program code is run by a terminal device, the terminal device performs the method according to any one of the second aspect or the possible implementations of the second aspect.

According to a ninth aspect, an embodiment of this application provides a computer readable medium, where the computer readable medium stores program code, and the program code includes instructions used to perform the method according to any one of the first aspect or the possible implementations of the first aspect.

According to a tenth aspect, an embodiment of this application provides a computer readable medium, where the computer readable medium stores program code, and the program code includes instructions used to perform the method according to any one of the second aspect or the possible implementations of the second aspect.

DETAILED DESCRIPTION OF ILLUSTRATIVE EMBODIMENTS

The following describes technical solutions of this application with reference to accompanying drawings.

It should be understood that division of manners, cases, and categories in the embodiments of this application are merely for ease of description, and should not constitute a particular limitation, and features of the manners, categories, and cases may be combined if they are not mutually exclusive.

The method in the embodiments of this application may be applied to a new radio (NR) communications system, a long term evolution (LTE) system, and a long term evolution-advanced (LTE-A) system, or may be applied to a similar wireless communications system such as a cellular system related to the 3rd generation partnership project (3GPP).

In the embodiments of this application, a network device is an apparatus that is deployed in a radio access network to provide a wireless communication function for a terminal device. The network device may include base stations in various forms, for example, a macro base station, a micro base station (also referred to as a small cell), a relay station, and an access point. A name of a device having a network access function may vary with a radio access technology used in a system. For example, the network device may be a network device such as a gNB or a TRP in a 5G system, or may be a network device in a future evolved public land mobile network (PLMN) system, or may be an access point (AP) in a wireless local area network (wireless local area networks, WLAN), or may be an evolved NodeB (eNodeB) in an LTE system or an LTE-A system, or may be a NodeB in a 3rd generation (3G) system. In addition, the network device may alternatively be an in-vehicle device or a wearable device.

In the embodiments of this application, a terminal device is a device that may provide voice and/or data connectivity for a user, and may be a device that accesses a system via a network device such as a gNB or a TRP in a 5G system, or may be a terminal device in a future evolved PLMN, or may be a terminal device in a WLAN, an LTE system, an LTE-A system, or a 3G system. The terminal device may also be referred to as user equipment (UE), an access terminal, a subscriber unit, a terminal device station, a mobile termination, a mobile station (MS), a remote station, a remote terminal, a mobile device, a user terminal, a terminal ( ), a wireless communications device, a terminal device agent, or a terminal device apparatus. The terminal device may be a handheld device having a wireless communication function, an in-vehicle device having a wireless communication function, a wearable device having a wireless communication function, a computing device having a wireless communication function, or another processing device connected to a wireless modem, or may be a subscriber unit, a cellular phone, a smartphone, a wireless data card, a personal digital assistant (PDA) computer, a tablet computer, a wireless modem, a handset, a laptop computer, a machine type communication (MTC) terminal, a station (ST) in a wireless local area network (wireless local area networks, WLAN), or may be a cellular phone, a cordless phone, a session initiation protocol (SIP) phone, a wireless local loop (WLL) station, or the like.

Figure 1:
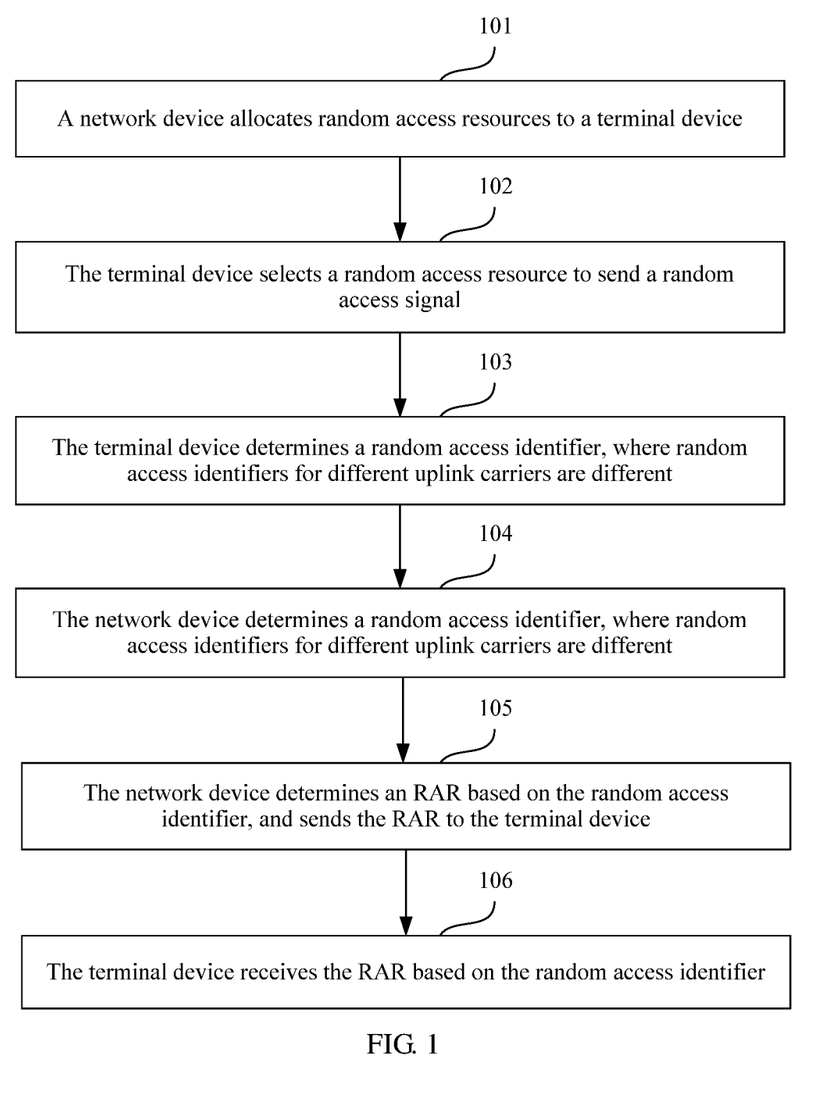
FIG. 1 is a flowchart of implementation of a method according to an embodiment of this application.

A 5G NR system is used as an example. As shown in FIG. 1, an implementation according to an embodiment of this application includes the following steps.

Step 101: A network device allocates a plurality of random access resources to a terminal device.

These random access resources may be physical random access channel (PRACH) resources.

These random access resources may be allocated to uplink carriers of different frequencies, and these uplink carriers are corresponding to a same downlink carrier.

These uplink carriers may include an uplink carrier that supports TDD and an uplink carrier that supports FDD. A quantity of random access resources on the uplink carrier that supports TDD is usually greater than a quantity of random access resources on the uplink carrier that supports FDD. Or these uplink carriers may include a supplementary uplink (SUL) carrier.

The 5G NR system is used as an example. These random access resources may be included on an uplink carrier on an NR-dedicated frequency band and an uplink carrier on a frequency band on which NR and LTE coexist, and the two uplink carriers are both corresponding to a downlink carrier in NR. Specifically, these random access resources may be allocated to an uplink carrier on a frequency band whose frequency is 3.5 GHz and an uplink carrier of a frequency band whose frequency is 1.8 GHz, and the two uplink carriers are both corresponding to a downlink carrier whose frequency is 3.5 GHz. For brevity of description, that a subsequent NR-dedicated frequency band is the frequency band whose frequency is 3.5 GHz is used as an example, and that a subsequent frequency band on which NR and LTE coexist is the frequency band whose frequency is 1.8 GHz is used as an example. Such the examples do not exclude a possibility that the frequency band on which NR and LTE coexist may include a frequency band of another frequency. The uplink carrier on the 3.5 GHz frequency band may support TDD, and the uplink carrier on the 1.8 GHz frequency band may support FDD.

Uplink carriers of different frequencies may belong to different radio access technologies. The 5G NR system is used as an example. The uplink carrier on the frequency band whose frequency is 3.5 GHz belongs to an access technology in 5G NR, and the uplink carrier on the frequency band whose frequency is 1.8 GHz belongs to an access technology in LTE.

The frequency band whose frequency is 3.5 GHz may include one uplink carrier, and there may be a plurality of random access resources on the uplink carrier, for example, six random access resources.

The frequency band whose frequency is 1.8 GHz may include one uplink carrier, or may include a plurality of uplink carriers. There may be one or more random access resources on each uplink carrier. Generally, a quantity of random access resources on each uplink carrier on the 1.8 GHz frequency band is less than a quantity of random access resources on the uplink carrier on the 3.5 GHz frequency band.

For a same time unit, these random access resources may be independently numbered for different uplink carriers in frequency domain. For example, frequency domain resource sequence numbers of the six random access resources on a first uplink carrier may be 0, 1, 2, 3, 4, and 5, and a frequency domain resource sequence number of one random access resource on a second uplink carrier may be 0. If there is still a third uplink carrier, a number of one random access resource on the third uplink carrier may be 1.

For a same time unit, these random access resources may be sequentially numbered for all uplink carriers. For example, the frequency band whose frequency is 3.5 GHz include one uplink carrier, that is a first uplink carrier, and there are six random access resources on the first uplink carrier; and the frequency band whose frequency is 1.8 GHz include one uplink carrier, that is a second uplink carrier, and there is one random access resource on the second uplink carrier. In this case, numbers of the six random access resources on the first uplink carrier may be 0, 1, 2, 3, 4, and 5, and a number of the one random access resource on the second uplink carrier is 6. If the frequency band whose frequency is 1.8 GHz further includes another uplink carrier such as a third uplink carrier, a number of one random access resource on the third uplink carrier may be 7.

The foregoing time unit is a period of time, and may be a subframe, a slot, a mini-slot, a symbol, or the like. The time unit may alternatively be a plurality of subframes, a plurality of slots, a plurality of mini-slots, a plurality of symbols, or the like. The time unit may be a unit of time for scheduling a transport block in a communications system. For example, the time unit may be a transmission time interval (TTI).

Step 102: When the terminal device needs to access a network, the terminal device selects a random access resource from these random access resources, and sends a random access signal to the network device on the selected random access resource.

The random access signal may include a random preamble sequence (preamble).

For ease of description, the selected random access resource is referred to as a first random access resource. The first random access resource may be on the uplink carrier on the 3.5 GHz frequency band, or may be on the uplink carrier on the 1.8 GHz frequency band. If a random access resource is also allocated to an uplink carrier on another frequency band, the first random access resource may also be on the uplink carrier on the another frequency band.

Step 103: After determining a first random access resource used to send the signal, the terminal device may determine a random access identifier corresponding to the first random access resource, where a first random access identifier determined when the first random access resource is on a first uplink carrier is different from a second random access identifier determined when a second random access resource is on a second uplink carrier.

In other words, the terminal device may determine the random access identifier before sending the random access signal or after sending the signal.

The random access identifier is an identifier related to random access. The random access identifier may be an RA-RNTI.

Step 104: After receiving the random access signal, the network device also needs to determine a corresponding random access identifier based on the first random access resource for sending the random access signal, where a first random access identifier determined when the first random access resource is on a first carrier is different from a second random access identifier determined when the second random access resource is on a second carrier.

Specifically, methods for determining random access identifiers by the terminal device and the network device are similar.

For example, a determining method may vary with a carrier.

Specifically, when the first random access resource is on the first uplink carrier, the calculated first random access identifier may meet a first formula. The first formula may be used to calculate the random access identifier based on a time-frequency resource sequence number of the random access resource.

For example, the first formula may include the following formula (1). In other words, the first random access identifier may be calculated according to the formula (1):

$$S=1+t\_id+n1*f\_id, \qquad (1)$$

where
- S is the random access identifier; t_id is related to a random access resource used by the terminal device to send the random access signal, and may be specifically a sequence number of a first time unit occupied by the random access resource; f_id is related to a random access resource used by the terminal device to send the random access signal, and may be specifically a frequency domain resource sequence number of the random access resource in the first time unit; and n1 is an integer, where n1 is usually a positive integer, or possibly, may be a negative integer.

When the first random access resource is on the second uplink carrier or a third uplink carrier, the calculated second random access identifier or a calculated third random access identifier may meet a second formula. Different from the first formula, the second formula is used to calculate the random access identifier based on a time-frequency resource sequence number of the random access resource and an offset, or calculate the random access identifier based on a time-frequency resource sequence number of the random access resource and a carrier sequence number of the second uplink carrier in an uplink carrier set. The uplink carrier set includes at least one uplink carrier, and the uplink carrier in the uplink carrier set and the first uplink carrier are corresponding to a same downlink carrier.

For example, the second formula includes the following formula (2). In other words, the second random access identifier or the third random access identifier may be calculated according to the formula (2):

$$S=1+t\_id+n2*f\_id+M, \qquad (2)$$

where
- S is the random access identifier, t_id is a sequence number of a first time unit occupied by the random access resource, f_id is a frequency domain resource sequence number of the random access resource in the first time unit, and both n2 and M are positive integers, or possibly, at least one of n2 and M may be a negative integer. Herein, n2 may be equal to n1, or may not be equal to n1.

Alternatively, the second formula includes the following formula (3):

$$S=1+t\_id+n2*f\_id+n3*c\_id+M, \qquad (3)$$

where
- S is the random access identifier, t_id is a sequence number of a first time unit occupied by the random access resource, f_id is a frequency domain resource sequence number of the random access resource in the first time unit, c_id is a carrier sequence number of the second uplink carrier or the third uplink carrier in an uplink carrier set, and n2, n3, and M are all positive integers, or possibly, at least one of n2, n3, and M may be a negative integer. Similarly, n2 may be equal to n1, or may not be equal to n1.

The uplink carrier set includes at least one uplink carrier, and the uplink carrier in the uplink carrier set and the first uplink carrier are corresponding to a same downlink carrier. In uplink carriers included in the uplink carrier set, all thereof are allocated random access resources, or only some thereof are allocated random access resources. The 5G NR system is used as an example. The uplink carrier included in the uplink carrier set is an uplink carrier on the frequency band on which NR and LTE coexist.

Alternatively, the second formula includes another formula such as similar variants of the foregoing formulas or the following formulas (a) and (b):

$$S=1+t\_id+10*(n-1)+60, \qquad (a)$$

where
- S is the random access identifier, t_id is a sequence number of a first time unit occupied by the random access resource, and n is a carrier sequence number of the second uplink carrier or the third uplink carrier in the uplink carrier set.

If there is only one uplink carrier in the uplink carrier set, for example, the second uplink carrier, the foregoing formula (a) may be simplified into the formula (b):

$$S=1+t\_id+60 \qquad (b)$$

For another example, if the allocated random access resources are sequentially numbered in frequency domain, in other words, numbers, namely, time-frequency resource sequence numbers, of random access resources on uplink carriers of different frequencies are different, each calculated random access identifier may meet the foregoing formula (1). That the time-frequency resource sequence numbers are different usually means that frequency domain resource sequence numbers are different.

In other words, each random access identifier may be calculated according to the foregoing formula (1), so that a prior-art formula can be directly used in this solution. Apparently, in this numbering manner, these random access identifiers may also be calculated by using one of the foregoing other formulas. Similar to the foregoing solution, a to-be-used formula may vary with a carrier.

If the allocated random access resources are independently numbered in frequency domain, in other words, numbers of random access resources on uplink carriers of different frequencies may be the same, the random access identifier further needs to be determined with reference to uplink carrier information. For example, each calculated random access identifier may meet a third formula. The third formula is used to calculate the random access identifier based on a time-frequency resource sequence number of the random access resource and a carrier identifier.

For example, the third formula may include the following formula (4). In other words, each random access identifier may be calculated according to the formula (4):

$$S=1+t\_id+n2*f\_id+n3*\text{carrier\_id}, \qquad (4)$$

where
- S is the random access identifier, t_id is a sequence number of a first time unit occupied by the random access resource, f_id is a frequency domain resource sequence number of the random access resource in the first time unit, carrier_id is an identifier of the first uplink carrier or the second uplink carrier, and both n2 and n3 are positive integers. The carrier identifier herein may be a carrier index.

In an implementation in which the random access identifier needs to be determined with reference to the uplink carrier information, the terminal device further needs to determine the carrier index. If there are only two uplink carriers, the terminal device and the network device may determine that one is the first uplink carrier and the other is the second uplink carrier according to a specified rule. Certainly, the network device may perform configuration and send an identifier of an uplink carrier to the terminal device. For example, the network device sends configuration information to the terminal device. The configuration information is used to indicate an identifier of a target uplink carrier, the target uplink carrier includes those carriers on which the terminal device is able to send a random access signal, and the identifier of the target uplink carrier includes a carrier index of the target uplink carrier.

If there are a plurality of uplink carriers, an implementation in which the network device performs configuration and sends configuration information may be usually used.

It should be noted that the implementation in which the network device performs configuration and sends the configuration information in this embodiment of this application is not limited to determining the random access identifier in this embodiment of this application, but may be further used in another case in which the carrier index needs to be obtained.

Step 105: The network device determines a random access response (RAR) based on the determined random access identifier, and sends the RAR to the terminal device.

Step 106: The terminal device receives the RAR from the network device based on the determined random access identifier.

In the foregoing solution, random access identifiers determined based on different random access resources are different, and the random access identifier determined by the terminal device and the network device based on the first random access resource is not same as the other random access identifiers. Therefore, the terminal device may correctly receive, from the network device based on the random access identifier, an RAR sent to the terminal device, so that the terminal device is prevented from incorrectly receiving an RAR of another terminal device, thereby avoiding a case in which random access performance is affected because the terminal device incorrectly receives an RAR.

Figure 2:
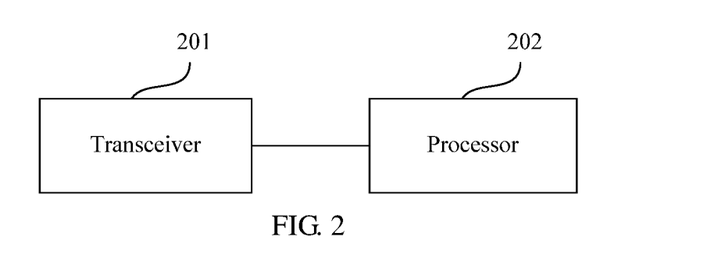
FIG. 2 is a schematic structural diagram of an information sending apparatus according to an embodiment of this application.

As shown in FIG. 2, an embodiment of this application further provides an information sending apparatus configured to perform the foregoing method on a network device side. The information sending apparatus may be a network device. The information sending apparatus includes a transceiver 201 and a processor 202.

The transceiver 201 may be configured to receive a random access signal of a terminal device from the terminal device on a random access resource, where the random access resource is on a first uplink carrier or a second uplink carrier, and the first uplink carrier and the second uplink carrier are corresponding to a same downlink carrier.

The processor 202 may be configured to: determine a random access identifier corresponding to the random access resource, where a random access identifier determined when the random access resource is on the first uplink carrier is a first random access identifier, a random access identifier determined when the random access resource is on the second uplink carrier is a second random access identifier, and the first random access identifier is different from the second random access identifier; and generate a random access response that includes the random access identifier based on the determined random access identifier.

The transceiver 201 may be further configured to send the random access response to the terminal device via the downlink carrier.

The transceiver 201 is further configured to send configuration information to the terminal device before receiving the random access signal, where the configuration information is used to indicate an identifier of a target uplink carrier, the target uplink carrier includes one or more carriers on which the terminal device is able to send a random access signal, the identifier of the target uplink carrier includes a carrier index of the target uplink carrier, and the target uplink carrier includes the first uplink carrier and the second uplink carrier.

Figure 3:
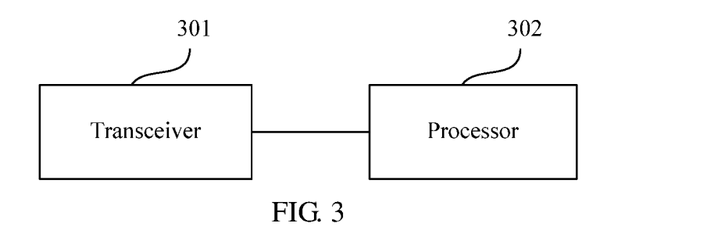
FIG. 3 is a schematic structural diagram of an information receiving apparatus according to an embodiment of this application.

As shown in FIG. 3, an embodiment of this application further provides an information receiving apparatus configured to perform the foregoing method on a terminal device side. The information receiving apparatus includes a transceiver 301 and a processor 302. The information receiving apparatus may be a terminal device, or may be a baseband chip.

The transceiver 301 may be configured to send a random access signal to a network device on a random access resource, where the random access resource is on a first uplink carrier or a second uplink carrier, and the first uplink carrier and the second uplink carrier are corresponding to a same downlink carrier.

The processor 302 may be configured to: determine a random access identifier corresponding to the random access resource, where a random access identifier determined when the random access resource is on the first uplink carrier is a first random access identifier, a random access identifier determined when the random access resource is on the second uplink carrier is a second random access identifier, and the first random access identifier is different from the second random access identifier.

The transceiver 301 may be further configured to receive a random access response from the network device on the downlink carrier.

The processor 302 may be further configured to determine, based on the determined random access identifier, that the random access response that includes the random access identifier is a random access response sent to the information receiving apparatus.

The transceiver 302 may be further configured to receive configuration information from the network device before sending the random access signal, where the configuration information is used to indicate an identifier of a target uplink carrier, the target uplink carrier includes one or more carriers on which the terminal device is able to send a random access signal, the identifier of the target uplink carrier includes a carrier index of the target uplink carrier, and the target uplink carrier includes the first uplink carrier and the second uplink carrier.

For the information sending apparatus and the information receiving apparatus, related descriptions of the first random access identifier and the second random access identifier that are determined by the processor thereof are described in the foregoing method embodiment.

An embodiment of this application further provides another implementation. For details, refer to FIG. 4. Some descriptions in this embodiment are the same as or similar to those in the foregoing embodiment. The following mainly describes some differences. This embodiment includes the following steps.

Figure 4:
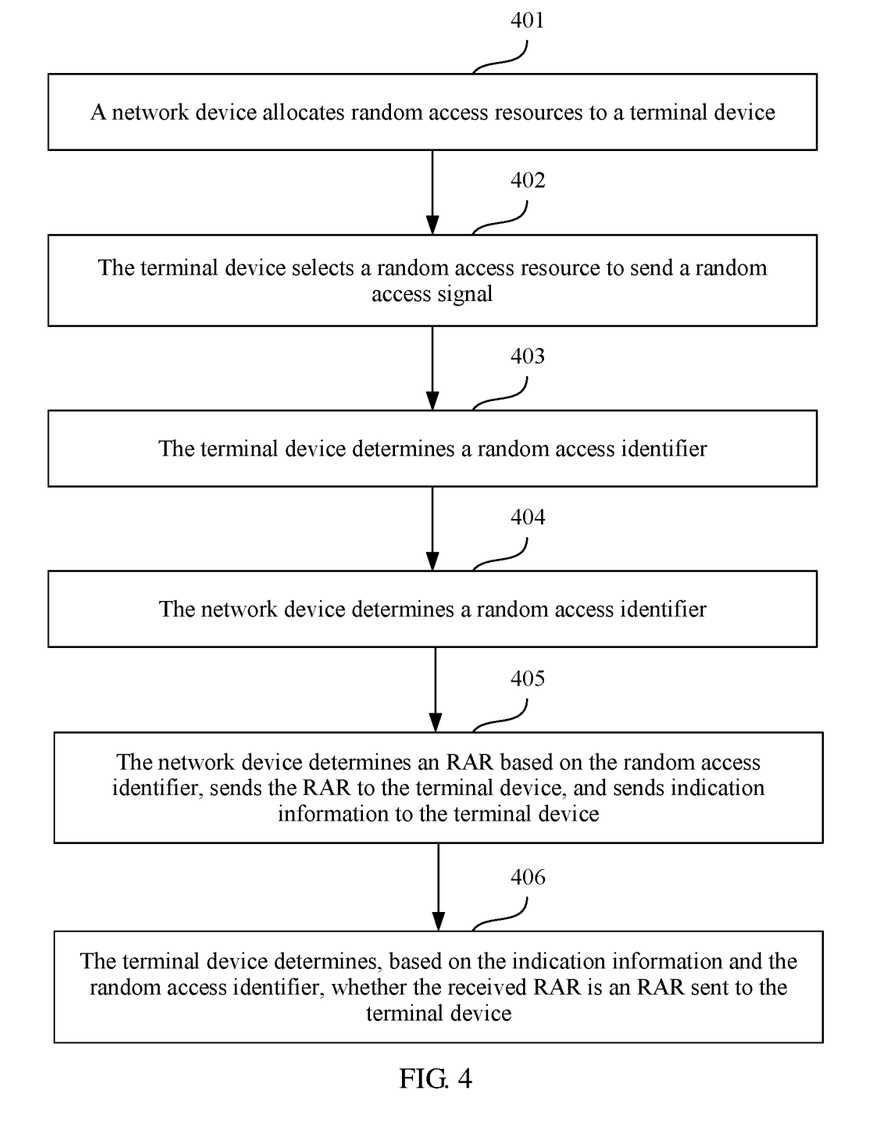
FIG. 4 is a flowchart of implementation of another method according to an embodiment of this application.

Step 401: A network device allocates a plurality of random access resources to a terminal device.

Step 402: When the terminal device needs to access a network, the terminal device selects a random access resource from these random access resources, and sends a signal to the network device on the selected random access resource.

Steps 401 and 402 are similar to steps 101 and 102. Therefore, details are not described again.

Step 403: After determining a first random access resource used to send the signal, the terminal device may determine a random access identifier corresponding to the first random access resource.

Step 404: After receiving the signal, the network device also needs to determine a corresponding random access identifier based on a first random access resource used to send the signal.

In the foregoing steps 403 and 404, the random access identifier corresponding to the first random access resource may meet the foregoing formulas, in other words, the random access identifier may be calculated according to the foregoing formulas.

Step 405: The network device determines an RAR based on the determined random access identifier, sends the RAR to the terminal device, and sends, to the terminal device, indication information used to indicate an uplink carrier that includes the first random access resource.

The first indication information may be included in the RAR, and specifically, may be carried on a PDSCH that carries the RAR, or may be carried on a PDCCH that schedules the PDSCH.

If there is one first uplink carrier and one second uplink carrier, the first indication information may be 1-bit. A state 0 indicates the first uplink carrier, and a state 1 indicates the second uplink carrier.

If there is one first uplink carrier, one second uplink carrier, one third uplink carrier, and one fourth uplink carrier, the first indication information may be 2-bit to indicate these uplink carriers. For example, a state 00 indicates the first uplink carrier, a state 01 indicates the second uplink carrier, a state 10 indicates the third uplink carrier, and a state 11 indicates the fourth uplink carrier. The description herein is merely an example, and there may be another indication manner. Each carrier has a carrier identifier, the first indication information indicates the carrier identifier, and the carrier identifier may be a carrier index.

Step 406: The terminal device receives the indication information and the RAR, and determines, based on the indication information and the random access identifier, whether the RAR is an RAR sent to the terminal device.

Specifically, the terminal device determines, based on the indication information, an uplink carrier indicated by the indication information. In the case that the random access identifier in the RAR is a random access identifier of the terminal device, if an uplink carrier that includes the first random access resource is the uplink carrier indicated by the indication information, the terminal device determines that the RAR is an RAR sent to the terminal device, and the terminal device may perform subsequent access processing based on the RAR accordingly; if an uplink carrier that includes the first random access resource is not the uplink carrier indicated by the indication information, the terminal device determines that the RAR is not an RAR sent to the terminal device, the terminal device cannot perform subsequent processing based on the RAR accordingly, and if the terminal device still needs to access a network, the terminal device may resend a random access signal.

In the foregoing solution, there are a plurality of uplink carriers that may be used to send the random access signal, and sequence numbers of random access resources on these uplink carriers may be the same. Therefore, random access identifiers for different terminal devices may be the same. In this embodiment of this application, the network device sends, to the terminal device, the indication information used to indicate the uplink carrier, so that when the random access identifiers are the same, the terminal device can determine, based on the indication information, whether an uplink carrier that includes the first random access resource is the uplink carrier indicated by the indication information, to determine whether the RAR sent by the network device is an RAR sent to the terminal device. Therefore, the terminal device is prevented from incorrectly receiving an RAR of another terminal device, thereby avoiding a case in which random access performance is affected because the terminal device incorrectly receives an RAR.

Corresponding to the solution in FIG. 4, an embodiment of this application further provides an information sending apparatus. The apparatus may include a transceiver and a processor.

The transceiver is configured to receive a random access signal of a terminal device from the terminal device on a first random access resource, where the random access resource is on a first uplink carrier or a second uplink carrier, and the first uplink carrier and the second uplink carrier are corresponding to a same downlink carrier.

The processor may be configured to: determine a random access identifier corresponding to the random access resource, generate a random access response that includes the random access identifier based on the determined random access identifier, and generate indication information used to indicate an uplink carrier that includes the first random access resource.

The transceiver may be further configured to send the indication information and the random access response to the terminal device via the downlink carrier.

Corresponding to the solution in FIG. 4, an embodiment of this application further provides an information receiving apparatus. The apparatus may include a transceiver and a processor.

The transceiver may be configured to: send a random access signal to a network device on a first random access resource, where the random access resource is on a first uplink carrier or a second uplink carrier, and the first uplink carrier and the second uplink carrier are corresponding to a same downlink carrier; and receive indication information used to indicate an uplink carrier that includes the first random access resource, and a random access response.

The processor may be configured to: determine a random access identifier corresponding to the first random access resource, and determine, based on the random access identifier and the indication information, whether the random access response is a random access response sent to the terminal device.

It should be noted that in the foregoing apparatus embodiments, the transceiver may be a transceiver unit, and the processor may be a processing unit.

An embodiment of this application further provides an apparatus. The apparatus exists in a product form of a chip. The apparatus includes a processor and a memory, the memory is configured to store program instructions, and the processor executes the program instructions stored in the memory, to implement the steps on a terminal device side in the method shown in FIG. 1 or FIG. 4.

Figure 5:
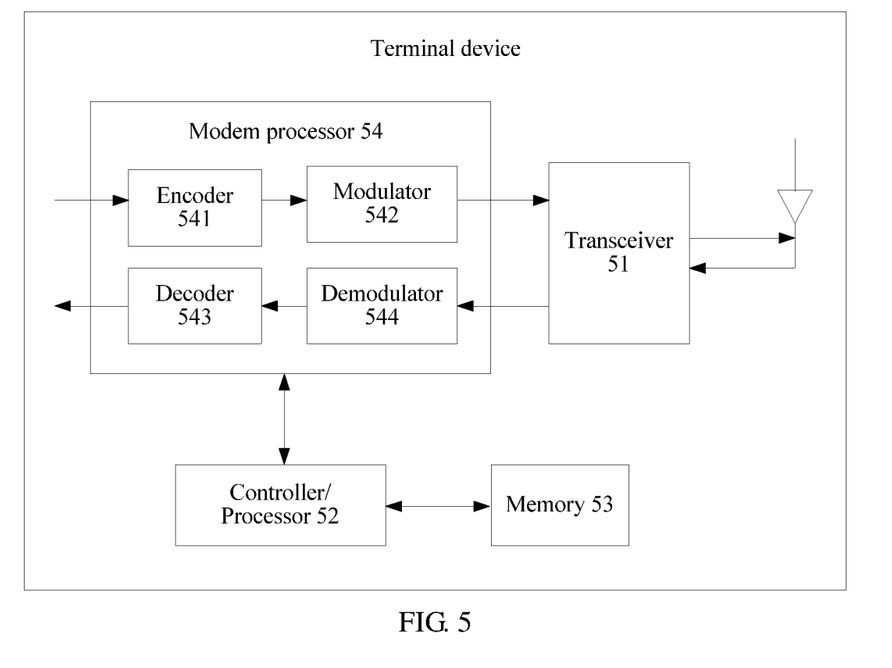
FIG. 5 is a schematic structural diagram of a terminal device according to an embodiment of this application.

FIG. 5 is a simplified schematic diagram of a possible design structure of a communications device such as a terminal device according to an embodiment of this application. The communications device may be the information receiving apparatus shown in FIG. 3. The communications device includes a transceiver 51 and a controller/processor 52, and may further include a memory 53 and a modem processor 54.

The transceiver 51 performs adjustment (for example, analog conversion, filtering, amplification, and up-conversion) on an output sample, and generates an uplink signal. The uplink signal is transmitted via an antenna to the base station in the foregoing embodiment. In a downlink, the antenna receives a downlink signal transmitted by the base station in the foregoing embodiment. The transceiver 51 performs adjustment (for example, filtering, amplification, down-conversion, and digitization) on a signal received from the antenna, and provides an input sample. In the modem processor 54, an encoder 541 receives service data and a signaling message that are to be sent in an uplink, and performs processing (for example, formatting, encoding, and interleaving) on the service data and the signaling message. A modulator 542 further performs processing (for example, symbol mapping and modulation) on encoded service data and an encoded signaling message, and provides an output sample. A decoder 543 performs processing (for example, de-interleaving and decoding) on symbol estimation, and provides decoded data and a decoded signaling message that are to be sent to the terminal device. A demodulator 544 performs processing (for example, demodulation) on the input sample, and provides symbol estimation. The encoder 541, the modulator 542, the decoder 543, and the demodulator 544 may be implemented by the combined modem processor 54. These units perform processing based on a wireless technology (for example, an access technology in LTE or another evolved system) used by a radio access network.

The controller/processor 52 performs control management on actions of the communications device such as the terminal device, and is configured to perform processing that is performed by the terminal device in the foregoing embodiment. The terminal device receives first information sent by a network device, and determines an uplink subcarrier mapping manner based on the first information. In an example, the controller/processor 52 may be configured to support the terminal device in performing the content related to the terminal device in FIG. 1 or FIG. 4. The memory 53 is configured to store program code and data used by the terminal device.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD for short)), or the like.

Although the embodiments of the present invention have been illustrated and described with reference to some implementations of this application, a person of ordinary skill in the art should understand that various changes may be made in terms of forms and details without departing from the scope of this application.

What is claimed is:

1. A method, comprising:
    sending, by a terminal device, a random access signal to a network device on a random access resource, wherein the random access resource is on a first uplink carrier or a second uplink carrier, wherein the first uplink carrier and the second uplink carrier both correspond to a downlink carrier, wherein the first uplink carrier is a supplementary uplink (SUL) carrier, and wherein the second uplink carrier is a time division duplex (TDD) uplink carrier;
    determining, by the terminal device, in response to the random access resource being on the second uplink carrier, a random access identifier corresponding to the random access resource according to a time-frequency resource sequence number of the random access resource and a carrier identifier of the second uplink carrier, wherein a relationship between the random access identifier, the time-frequency resource sequence number, and the carrier identifier satisfies: $S=1+t\_id+10*(n-1)+60$, wherein S is the random access identifier, t_id is a sequence number of a first time unit occupied by the random access resource, and n is a carrier sequence number of the second uplink carrier; and
    receiving, by the terminal device on the downlink carrier, a random access response from the network device according to the random access identifier.

2. The method according to claim 1, wherein a frequency band on which the first uplink carrier is located is different from a frequency band on which the second uplink carrier is located.

3. The method according to claim 1, wherein the random access identifier is a random access-radio network temporary identifier (RA-RNTI).

4. The method according to claim 1, wherein the method further comprises:
    determining, by the terminal device, in response to the random access resource being on the first uplink carrier, a random access identifier corresponding to the random access resource, wherein the random access identifier meets $S=1+t\_id+n1*f\_id$, wherein S is the random access identifier, t_id is a sequence number of a first time unit occupied by the random access resource, f_id is a frequency domain resource sequence number of the random access resource in the first time unit, and n1 is a positive integer.

5. The method according to claim 1, wherein the random access resource is independently numbered in frequency domain for different uplink carriers.

6. A method, comprising:
receiving, by a network device, a random access signal from a terminal device on a random access resource, wherein the random access resource is on a first uplink carrier or a second uplink carrier, wherein the first uplink carrier and the second uplink carrier both correspond to a downlink carrier, wherein the first uplink carrier is a supplementary uplink (SUL) carrier, and wherein the second uplink carrier is a time division duplex (TDD) uplink carrier;
determining, by the network device, in response to the random access resource being on the second uplink carrier, a random access identifier corresponding to the random access resource according to a time-frequency resource sequence number of the random access resource and a carrier identifier of the second uplink carrier, wherein a relationship between the random access identifier, the time-frequency resource sequence number, and the carrier identifier satisfies: $S=1+t\_id+10*(n-1)+60$, wherein S is the random access identifier, $t\_id$ is a sequence number of a first time unit occupied by the random access resource, and n is a carrier sequence number of the second uplink carrier; and
sending, by the network device on the downlink carrier, a random access response to the terminal device according to the random access identifier.

7. The method according to claim 6, wherein a frequency band on which the first uplink carrier is located is different from a frequency band on which the second uplink carrier is located.

8. The method according to claim 6, wherein the random access identifier is a random access-radio network temporary identifier (RA-RNTI).

9. The method according to claim 6, wherein the method further comprises:
determining, by the network device, in response to the random access resource being on the first uplink carrier, a random access identifier corresponding to the random access resource, wherein the random access identifier meets $S=1+t\_id+n1*f\_id$, wherein S is the random access identifier, $t\_id$ is a sequence number of a first time unit occupied by the random access resource, $f\_id$ is a frequency domain resource sequence number of the random access resource in the first time unit, and n1 is a positive integer.

10. The method according to claim 6, wherein the random access resource is independently numbered in frequency domain for different uplink carriers.

11. An apparatus, comprising:
at least one processor; and
a memory coupled to the at least one processor, the at least one processor being configured to:
send a random access signal to a network device on a random access resource, wherein the random access resource is on a first uplink carrier or a second uplink carrier, wherein the first uplink carrier and the second uplink carrier both correspond to a downlink carrier, wherein the first uplink carrier is a supplementary uplink (SUL) carrier, and wherein the second uplink carrier is a time division duplex (TDD) uplink carrier;
determine, in response to the random access resource being on the second uplink carrier, a random access identifier corresponding to the random access resource according to a time-frequency resource sequence number of the random access resource and a carrier identifier of the second uplink carrier, wherein a relationship between the random access identifier, the time-frequency resource sequence number, wherein the carrier identifier satisfies: $S=1+t\_id+10*(n-1)+60$, wherein S is the random access identifier, wherein $t\_id$ is a sequence number of a first time unit occupied by the random access resource, and wherein n is a carrier sequence number of the second uplink carrier; and
receive, on the downlink carrier, a random access response from the network device according to the random access identifier.

12. The apparatus according to claim 11, wherein a frequency band on which the first uplink carrier is located is different from a frequency band on which the second uplink carrier is located.

13. The apparatus according to claim 11, wherein the random access identifier is a random access-radio network temporary identifier (RA-RNTI).

14. The apparatus according to claim 11, wherein the at least one processor being further configured to:
when the random access resource is on the first uplink carrier, determine a random access identifier corresponding to the random access resource, wherein the random access identifier meets $S=1+t\_id+n1*f\_id$, wherein S is the random access identifier, $t\_id$ is a sequence number of a first time unit occupied by the random access resource, $f\_id$ is a frequency domain resource sequence number of the random access resource in the first time unit, and n1 is a positive integer.

15. The apparatus according to claim 11, wherein the random access resource is independently numbered in frequency domain for different uplink carriers.

16. An apparatus, comprising:
at least one processor; and
a memory coupled to the at least one processor, the at least one processor being configured to:
receive a random access signal from a terminal device on a random access resource, wherein the random access resource is on a first uplink carrier or a second uplink carrier, wherein the first uplink carrier and the second uplink carrier both correspond to a downlink carrier, wherein the first uplink carrier is a supplementary uplink (SUL) carrier, and wherein the second uplink carrier is a time division duplex (TDD) uplink carrier;
determine, in response to the random access resource being on the second uplink carrier, a random access identifier corresponding to the random access resource according to a time-frequency resource sequence number of the random access resource and a carrier identifier of the second uplink carrier, wherein a relationship between the random access identifier, the time-frequency resource sequence number, and the carrier identifier satisfies: $S=1+t\_id+10*(n-1)+60$, wherein S is the random access identifier, $t\_id$ is a sequence number of a first time unit occupied by the random access resource, and n is a carrier sequence number of the second uplink carrier; and
send, on the downlink carrier, a random access response to the terminal device according to the random access identifier.

17. The apparatus according to claim 16, wherein a frequency band on which the first uplink carrier is located is different from a frequency band on which the second uplink carrier is located.

18. The apparatus according to claim 16, wherein the random access identifier is a random access-radio network temporary identifier (RA-RNTI).

19. The apparatus according to claim 16, wherein the at least one processor is further configured to:
   determine, in response to the random access resource being on the first uplink carrier, a random access identifier corresponding to the random access resource, wherein the random access identifier meets $S=1+t\_id+n1*f\_id$, wherein S is the random access identifier, $t\_id$ is a sequence number of a first time unit occupied by the random access resource, $f\_id$ is a frequency domain resource sequence number of the random access resource in the first time unit, and n1 is a positive integer.

20. The apparatus according to claim 16, wherein the random access resource is independently numbered in frequency domain for different uplink carriers.

* * * * *